(12) United States Patent
Yi-Chen

(10) Patent No.: US 7,280,154 B1
(45) Date of Patent: Oct. 9, 2007

(54) INTERPOLATIVE INTERLEAVING OF VIDEO IMAGES

(75) Inventor: Chung Yi-Chen, Nantow (TW)

(73) Assignee: SigmaTel, Inc., Austin, TX (US)

( * ) Notice: Subject to any disclaimer, the term of this patent is extended or adjusted under 35 U.S.C. 154(b) by 642 days.

(21) Appl. No.: 10/763,572

(22) Filed: Jan. 23, 2004

(51) Int. Cl.
*H04N 7/01* (2006.01)

(52) U.S. Cl. ............ 348/447; 348/910; 348/458; 348/559; 348/625

(58) Field of Classification Search ........... 348/447, 348/910, 448, 559, 701, 458, 441, 625; 382/260, 382/262, 263, 298–300
See application file for complete search history.

(56) References Cited

U.S. PATENT DOCUMENTS

| | | | | |
|---|---|---|---|---|
| 4,845,557 A | * | 7/1989 | Lang | 348/559 |
| 5,973,746 A | * | 10/1999 | Nakamoto et al. | 348/458 |
| 6,118,488 A | * | 9/2000 | Huang | 348/452 |

* cited by examiner

*Primary Examiner*—Victor R. Kostak
(74) *Attorney, Agent, or Firm*—Toler Schaffer, LLP

(57) ABSTRACT

A video processing system is presented that interleaves video data. In accordance with some embodiments of the present invention, data from a first field is placed in a frame and is augmented with pixel values in adjacent alternate rows of the frame with pixel values determined from the pixel values in the first field data and pixel values from the second field data.

5 Claims, 5 Drawing Sheets

INTERPOLATIVE INTERLEAVING OF VIDEO IMAGES

BACKGROUND

1. Field of the Invention

The present invention is related to video signal filtering and, more particularly, to interpolative interleaving of video images.

2. Background of the Invention

Television or video images are sequentially scanned in horizontal lines, beginning with the upper left corner of the image and ending at the lower right corner of the image at the end of the scan. Typically, two fields are utilized—an upper field (field 0) and a lower field (field 1). Video can be classified as interlaced or progressive, depending on how the two fields are interleaved into the displayed image.

In some systems, for example TV or other more conventional video display system, field 0 is placed into alternate, even-numbered lines of the image frame in a first pass and field 1 is interleaved into alternate, odd-numbered lines of the image in a second pass. The image is formed from the alternating display of images from the upper and lower fields. This form of interlacing, in television, results in the raster scanning of field 0 into every other video line followed by raster scanning of field 1 into every other video line. Historically, this type of interlaced video relies on the nature of human vision in order to display the video data in a fashion that can be easily transmitted. Thus, transmission of video data in a time-scale acceptable for viewing by the human eye can be accomplished.

In monitors and other digital video systems, progressive scanning can be utilized to display the entire image at once, instead of displaying half the image In monitors and other digital video systems, progressive scanning can be utilized to display the entire image at once, instead of displaying half the image represented by field 0 pixel data followed closely by displaying the other half of the image represented by field 1 pixel data. Progressive scanning involves displaying the upper field (or field 0) data in even number lines of a video frame (starting with line 0) while display the lower field (or field 1) in the odd number lines of a video frame. In some embodiments, the upper field (field 0) may be displayed first by arranging the field 0 pixel data in the even number lines of the video frame and then the video frame is filled in with the lower field pixel data in the odd-numbered lines of the video image. This type of progressive display results in an image formed from the field 0 pixel data followed by augmentation of the image formed by the field 1 pixel data.

With the increased speed of processing systems that can be utilized to process video data into images, progressive image display resulting from forming a complete image from field 0 and field 1 data before display. The video data, then, is completely compiled in the frame before the image is displayed.

However, with transmission of video data in two fields (i.e., field 0 and field 1), there can be problems with aligning the field 0 data with the field 1 data in order to provide a clear image without artifacts, in either method of progressive display. For example, video noise and miss-timing between the upper and lower field data may be at issue. Where data from field 0 is augmented by data from field 1 in a progressive fashion, flicker or fuzzing of the image may result from misaligned video data. Where data from field 0 and field 1 are compiled together, the resulting image may lose the resolution it might otherwise have if the data from the two fields were better coordinated.

Therefore, there is a need for video display systems that filter interlaced video data in order to provide sharp images in a timely fashion.

SUMMARY

In accordance with embodiments of the present invention, an interpolative video filter is disclosed for progressively displayed images. In accordance with embodiments of the present invention, a video filter receives video data from a first field and video data from a second field and forms a video frame of filtered video data. An image can be displayed by displaying the pixel values stored in the video frame of filtered video data.

A method of interleaving video data according to the present invention involves placing first pixel values from the first field of video data into alternating rows of pixels in a video frame and augmenting the video frame in the remaining rows with replacement pixel values determined from the first pixel values and second pixel values from a second field of video data. In some embodiments, augmenting the video frame can include interpolating from the first pixel values in the video frame to provide interpolated pixel values in rows of pixels between the alternating rows of pixels with the first pixel values; selecting a sub-block of pixels centered on a current pixel; determining a set of filter values from spatially filtering the sub-block of pixels with a set of spatial filters; determining video values based on the set of filter values; and determining a replacement pixel value based on the video values and a corresponding pixel value from a second field of video data.

These and other embodiments are further discussed below with respect to the following figures.

In the figures, elements having the same or similar functions can have the same element label.

DETAILED DESCRIPTION

Figure 1:
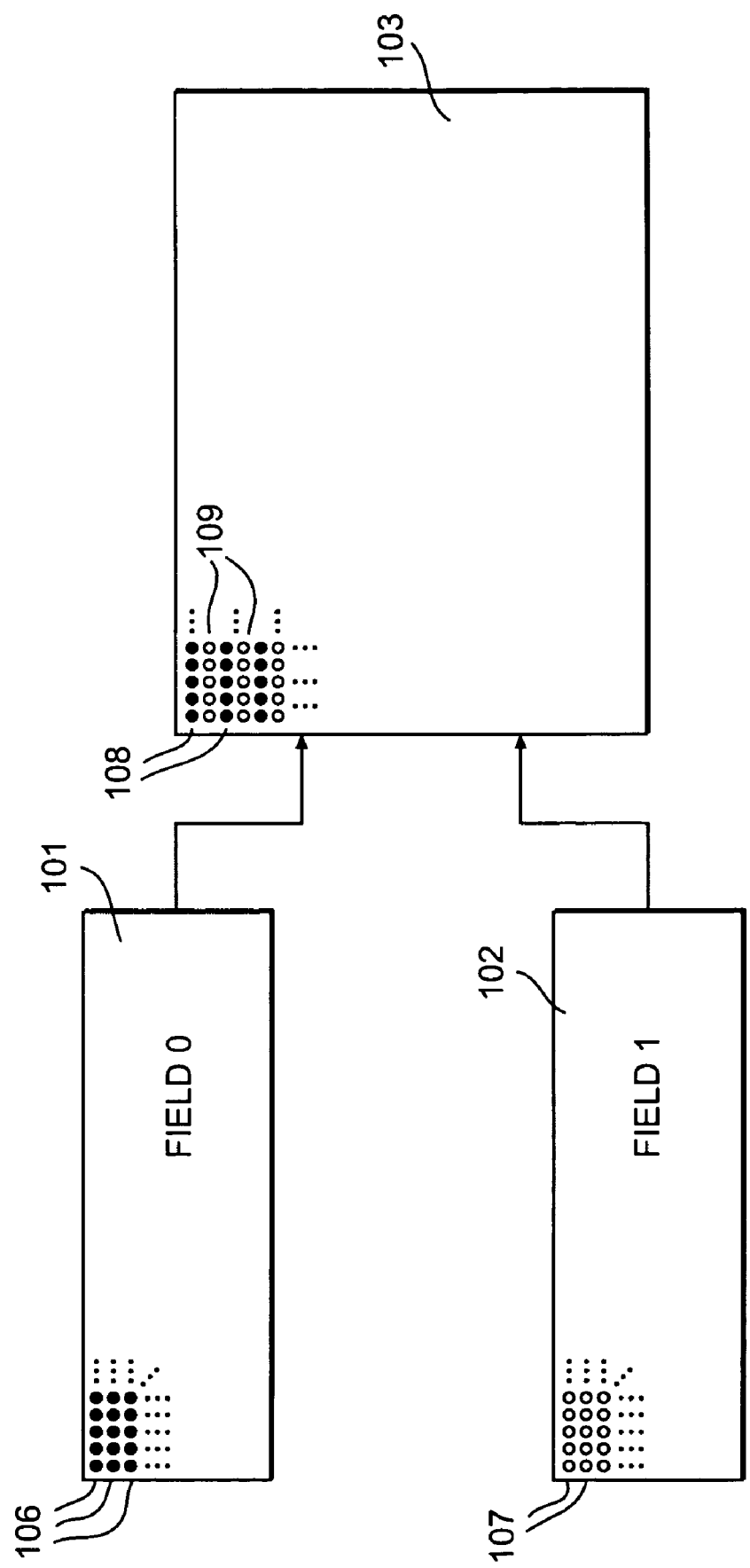
FIG. 1 illustrates use of interlaced data to form an image in conventional progressively displayed images.

FIG. 1 illustrates interlacing of data from a first field 101, commonly referred to as field 0 or the upper field, and a second field 102, commonly referred to as field 1 or the lower field, to form a frame 103 of video image data in a progressive fashion. Frame 103 represents interleaved pixel values from first field 101 and second field 102 that can be displayed on a monitor to form an image. Pixel data from first field 101 and from second field 102 are alternately written, row-wise, into frame 103 to provide video data for the image.

As illustrated in FIG. 1, the first row of pixel data in first field 101 is written into the first row of frame 103, commonly referred to as row 0. The rows of pixel data 106 in first field 101 are written into alternating rows 108 of frame 103, referred to as the "even rows" of frame 103. For example, pixel data from first field 101 are written into even rows 108 of frame 103, with row numbers 0, 2, 4, 6, 8, . . . N. The value N is an even number that describes the vertical pixel size of frame 103. The number of columns of frame 103, M, defines the horizontal pixel size of frame 103. Frame 103 can have any pixel size. Some common pixel sizes include, in column × row format, include 640×480, 1024×768, 1280×1024, and 1600×1200. Other sizes for frame 103 can also be utilized.

The rows of data 107 in second field 102 are written into the pixel rows 109 between even rows 108 of frame 103. As such, the entire image formed by frame 103 is built from pixel data directly read from field 101 and from field 102. In some systems, all of field 101 is scanned into frame 103 and frame 103 is then displayed. Data from field 102 can then be added in a second step to augment the image. In many modern systems, however, the whole image depicted by frame 103 is formed by the interleaving of pixel data from field 101 and field 102 before frame 103 is displayed. Modern processing systems are of sufficient speed to allow for video processing at a speed sufficient to process and display images at a rate unnoticed by the viewer.

Data in field 101 and field 102 are transmitted to a display unit separately, however. The data error rates and the bandwidth required for transmission may be lessened in this fashion. Further, more conventional systems transmit data utilizing a two-field approach for television. Transmission of video data in this fashion is supported by various video transmission standards. In television systems, field 101 would be displayed by a raster system and then field 102 would be displayed, relying on the response of the human eye to form a sharper image on the display than is represented by data in field 101 or field 102 separately.

When the whole image is formed progressively in frame 103, errors may be evident. For example, pixel data from field 101 and pixel data from field 102 may be miss-timed, resulting in a blurring of an image formed by interlacing field 101 and field 102 in frame 103. Other video artifacts may result from transmission errors in field 101 and field 102.

Figure 2:
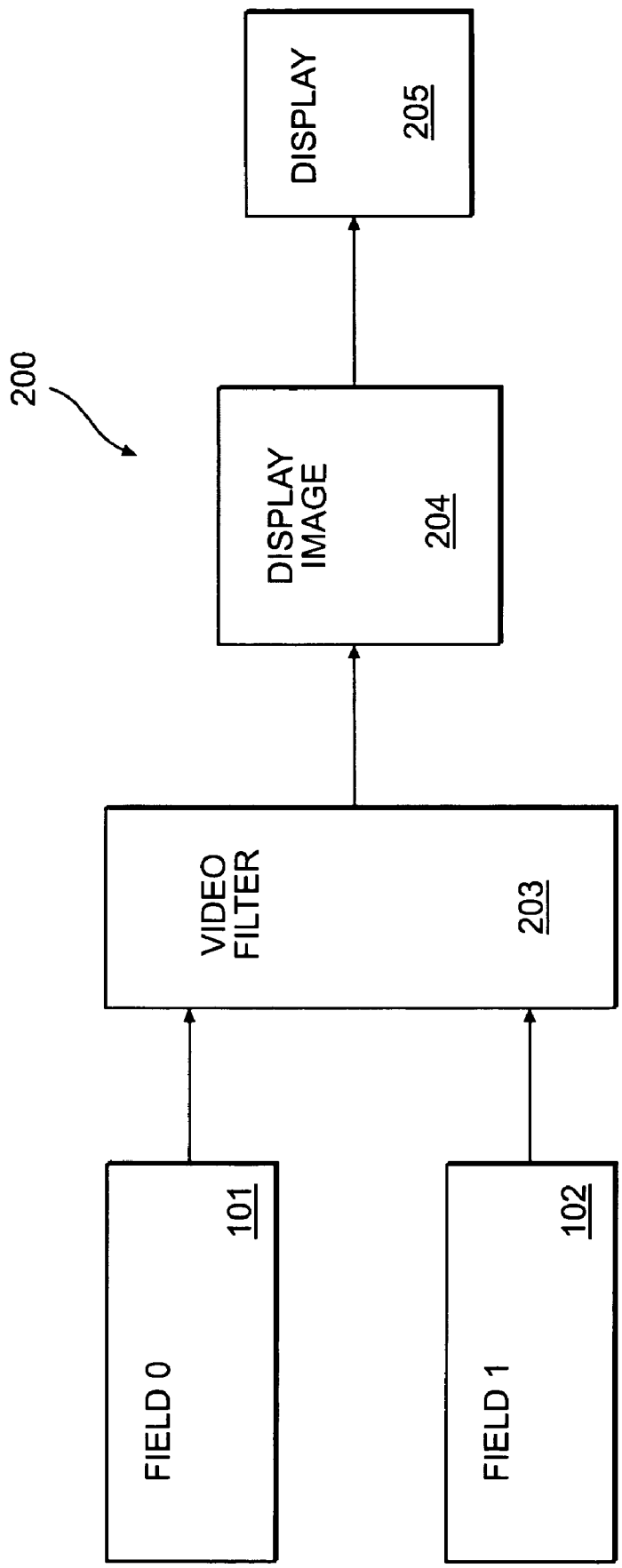
FIG. 2 shows a video system with a video filter in accordance with embodiments of the present invention.

FIG. 2 illustrates a video system 100 according to the present invention. As shown in FIG. 2, data from first field 101 and from second field 102 are input to video filter 203. Video filter 203 filters and interlaces the pixel data from field 101 and field 102 to create data for a display image in frame 204. Pixel data in frame 204 can then be displayed on display 205. In some embodiments, video filter 203 places pixel values from field 101 into a frame of data and then places data corresponding to pixel values of field 102 into the frame based on the pixel values from field 101 and the pixel values from field 102. Video system 100, then, determines the pixel values used to augment the field 101 pixel values by utilizing both field 101 pixel values and pixel values from field 102 instead of simply inserting the field 102 pixel values into the image frame with the field 101 pixel values.

Figure 3:
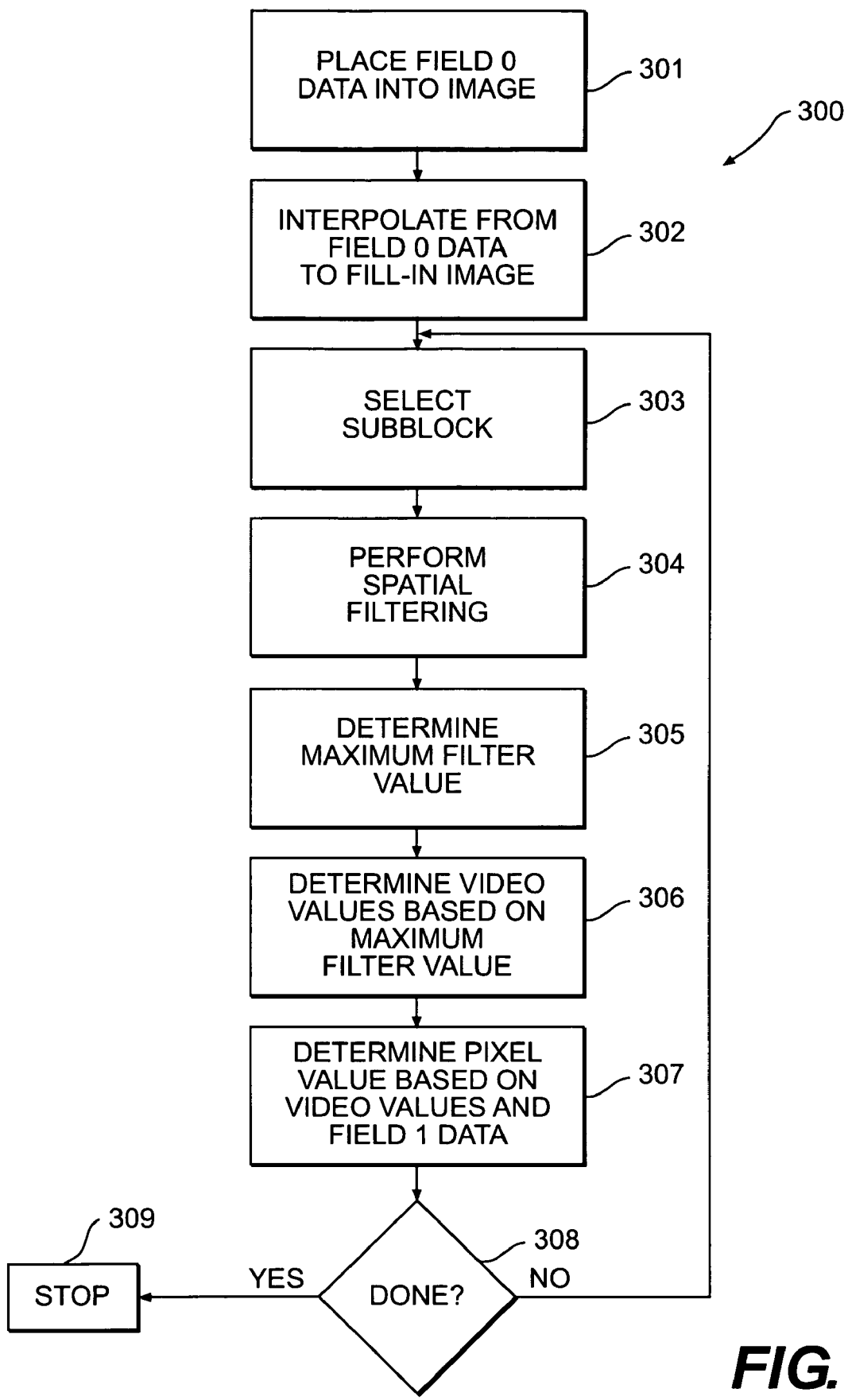
FIG. 3 shows a flow chart of a video filter according to some embodiments of the present invention.

FIG. 3 shows a flow chart 300 illustrating some embodiments of video filter 203. Flow chart 300 describes an algorithm executed on a processor for processing received video data. The algorithm represented by flow chart 300 can be implemented by software stored in a memory (not shown) and executed on a processor (not shown), may be implemented in digital hardware in a digital signal processor, or may be implemented in a combination of digital circuitry and software executed on the processor.

Figure 4A:
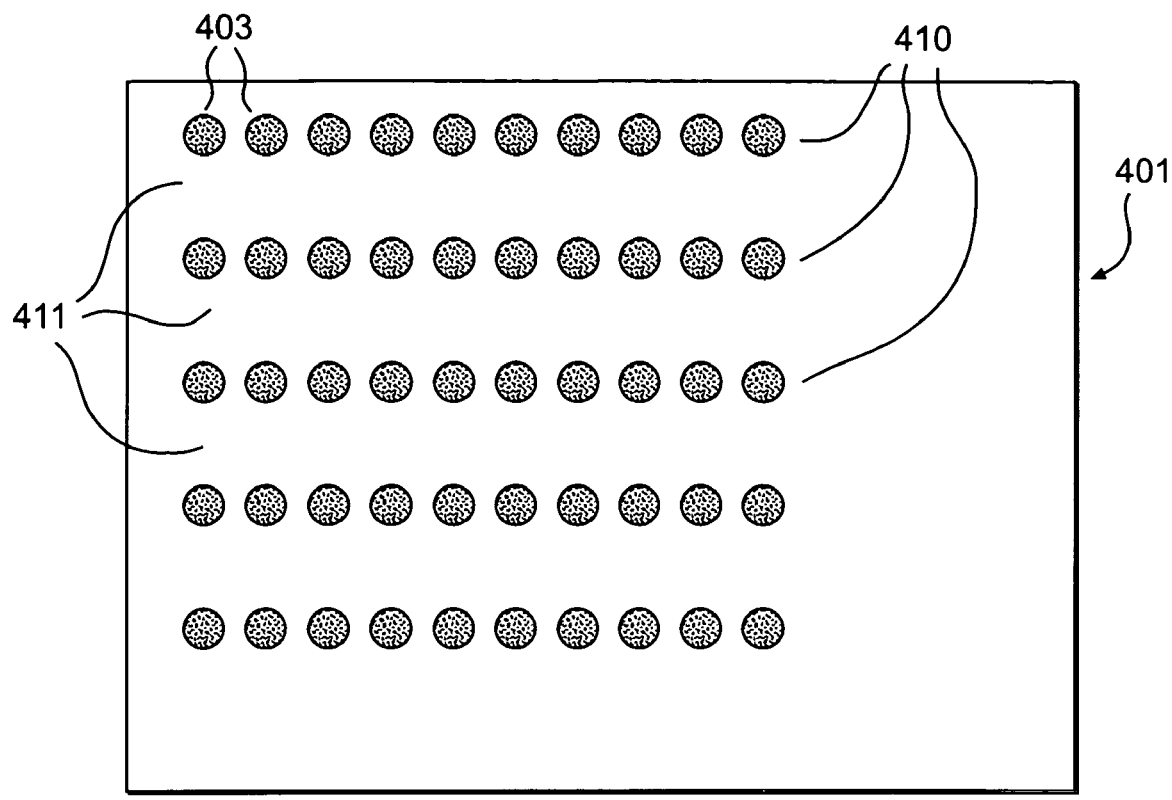
FIGS. 4A through 4D illustrate various features of the flow chart shown in FIG. 3.

In step 301, the data from first field 101, field 0 data, is inserted into a frame 401, as is illustrated in FIG. 4A. Pixel values 403 from first field 101 are inserted into alternating rows 410 in frame 401. As discussed above, pixel values 403 from first field 101 then occupy alternating rows 410, which may labeled even rows 0 through N. Pixel values 403 in frame 401, illustrated as solid circles in FIG. 4A, only occupies every other line in frame 401 and can be given by $$F_{i,j} = f_{k,j}^{(0)},$$

where i=2k, k=0, 1 2, 3, . . . , N/2, j=0, 1, . . . , M, and $f_{k,j}^{(0)}$ are the pixel values in field 101, where k designates the row and j designates the column of the test value in field 101.

Figure 4B:
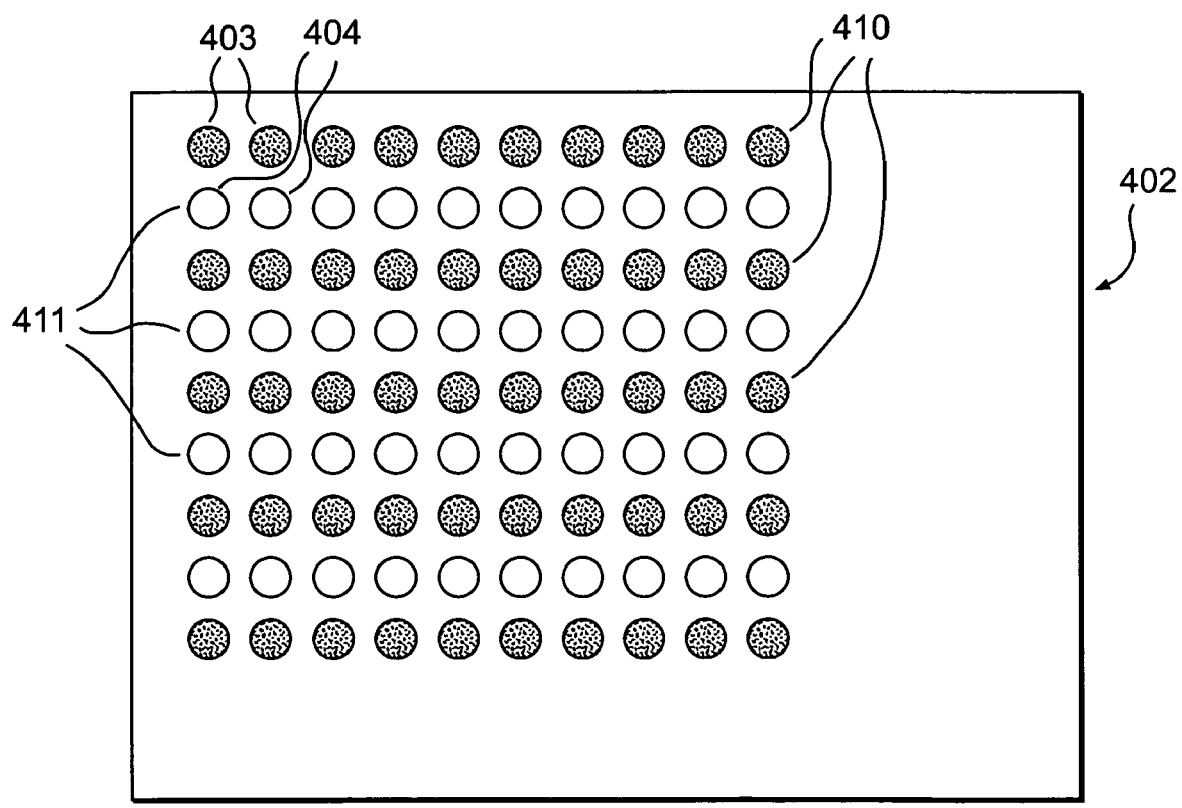

In step 302, as illustrated in FIG. 4B, pixel data 404 for the remaining, now empty, rows 411 of frame 402, designated as open circles, is determined by interpolation from pixel values 403. In some embodiments, pixel data 403 for each of the pixels designated as open circles in FIG. 402 is determined by averaging values from pixel data 403 located directly above (in the same column) and the pixel value located directly below (in the same column) the pixel value 404 that is currently being estimated. In other words, the open circle values can be given by $$F_{i,j} = (F_{i-1,j} + F_{i+1,j})/12,$$

where i is 1, 3, 5, . . . , representing the odd numbered rows 411 of frame 402. In some embodiments, a more elaborate interpolation scheme may be implemented. For example, each of pixel values 404 may be calculated based on the six nearest-neighbor pixel values 403 in frame 404. Edge columns may be replicated in order to calculate the first column of pixel values 404 in frame 402. In some embodiments, weighted averages of the surrounding pixel values 403 can be utilized to interpolate a pixel value 404.

Figure 4C:
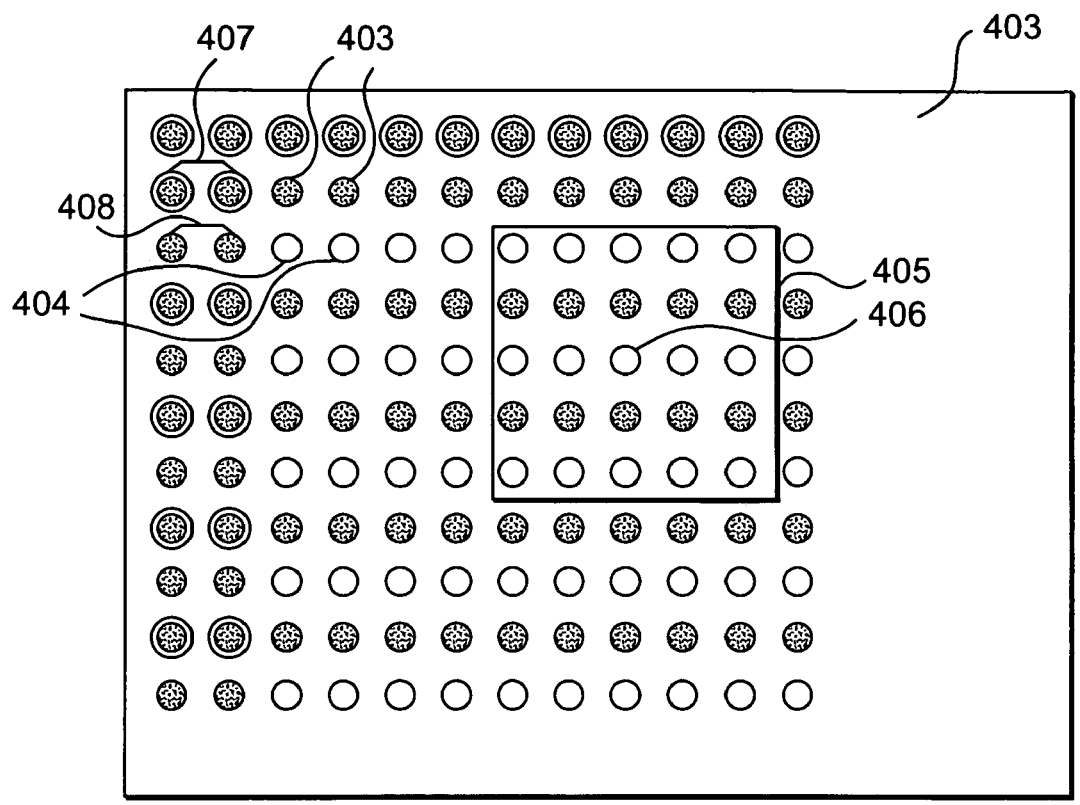

In step 303, as shown in FIG. 4C, a sub-block centered around a chosen one of pixel values 404 is chosen. In the example shown in FIG. 4C, the chosen one of pixel values 404 is pixel value 406. In order to define a sub-block around pixel values 404 which lie on or close to the edges of frame 402, frame 402 can be expanded, for computational purposes, by replicating the first column of frame 402 into several columns on the left side of frame 403 and replicating the last column of frame 403 into several columns on the rightmost side of frame 403, depending on the dimensions of sub-block 405. In the example illustrated in FIG. 4C, sub-block 405 is a 5×5 pixel sub-block, and therefore the first column, column 0, and the last column, column M, of data are replicated twice.

Similarly, the first row of frame 402, row 0, is replicated as many times as necessary on top of frame 403 and the last row of frame 403 is replicated as many times as is necessary on the bottom of frame 403. In an embodiment where sub-block 405 is a 5×5 block of pixels, then the first row (row 0) of frame 403 and the last row (row N) of frame 403 are each replicated once.

All of the rows of frame 402, rows 0 through N, are then copied into frame 403 between the duplicated left columns and the right columns, the top row and the bottom row to form a complete pixel array. In this fashion, frame 402 is expanded so that a sub-block can be formed around the pixel value $F_{1,0}$, for example. In some embodiments, physically copying values from frame 402 into frame 403 is not necessary, instead the expansion can be accomplished virtually in software.

Once frame 402 has been expanded to frame 403, sub-blocks around each of pixels $F_{2i,j}$, where i=0, 1, 2, . . . and j=0, 1, 2, 3, . . . can be formed. In FIG. 4C, sub-block 405 is formed with pixel value 406 at its center. In some embodiments of the invention, sub-block 405 can be of a different size than the 5×5 sub-block depicted here. For example, sub-block 405 can be a 7×7 sub-block, a 9×9 sub-block, or any other sub-block with pixel value 406 at its center.

In step 304 of flow chart 300, a series of values are computed for sub-block 405 by asserting a spatial filter onto sub-block 405. A series of values can be obtained by $$A(r) = B*S(r)/N(r) = \sum_{k=1}^{5}\sum_{l=1}^{5} B_{k,l} S_{k,l}(r)/N(r),$$

where B is the array of pixel values represented as sub-block 405 in FIG. 4C, S(r) is a spatial filter array, and N(r) is a normalization value associated with spatial filter array S(r). Although, as discussed above, sub-block 405 may be of any size, in the above sums describing the product of B and S(r), sub-block 405 is a 5×5 block.

A representative set of spatial filter arrays S(r) and corresponding normalization values N(r) is given by:

$$S(0) = \begin{pmatrix} 100 & 100 & 0 & -100 & -100 \\ 100 & 100 & 0 & -100 & -100 \\ 100 & 100 & 0 & -100 & -100 \\ 100 & 100 & 0 & -100 & -100 \\ 100 & 100 & 0 & -100 & -100 \end{pmatrix}; \quad N(0) = 1000.0;$$

$$S(1) = \begin{pmatrix} -100 & -100 & -100 & -100 & -100 \\ -100 & -100 & -100 & -100 & -100 \\ 0 & 0 & 0 & 0 & 0 \\ 100 & 100 & 100 & 100 & 100 \\ 100 & 100 & 100 & 100 & 100 \end{pmatrix}; \quad N(1) = 1000.0;$$

$$S(2) = \begin{pmatrix} 0 & 0 & 0 & 0 & 0 \\ -50 & -50 & -50 & -50 & -50 \\ 100 & 100 & 100 & 100 & 100 \\ -50 & -50 & -50 & -50 & -50 \\ 0 & 0 & 0 & 0 & 0 \end{pmatrix}; \quad N(2) = 500.0;$$

$$S(3) = \begin{pmatrix} 100 & -32 & -100 & -100 & -100 \\ 100 & 78 & -92 & -100 & -100 \\ 100 & 100 & 0 & -100 & -100 \\ 100 & 100 & 92 & -78 & -100 \\ 100 & 100 & 100 & 32 & -100 \end{pmatrix}; \quad N(3) = 1102.0;$$

$$S(4) = \begin{pmatrix} -100 & -100 & -100 & -100 & -100 \\ -100 & -100 & -100 & -78 & 32 \\ -100 & -92 & 0 & 92 & 100 \\ -32 & 78 & 100 & 100 & 100 \\ 100 & 100 & 100 & 100 & 100 \end{pmatrix}; \quad N(4) = 1102.0;$$

$$S(5) = \begin{pmatrix} 0 & -50 & 100 & -50 & 0 \\ 0 & -50 & 100 & -50 & 0 \\ 0 & -50 & 100 & -50 & 0 \\ 0 & -50 & 100 & -50 & 0 \\ 0 & -50 & 100 & -50 & 0 \end{pmatrix}; \quad N(5) = 500.0;$$

-continued $$S(6) = \begin{pmatrix} -100 & -100 & -100 & -100 & -100 \\ 32 & -78 & -100 & -100 & -100 \\ 100 & 92 & 0 & -92 & -100 \\ 100 & 100 & 100 & 78 & -32 \\ 100 & 100 & 100 & 100 & 100 \end{pmatrix}; \quad N(6) = 1102.0;$$

$$S(7) = \begin{pmatrix} -100 & -100 & -100 & -32 & 100 \\ -100 & -100 & -92 & 78 & 100 \\ -100 & -100 & 0 & 100 & 100 \\ -100 & -78 & 92 & 100 & 100 \\ -100 & 32 & 100 & 100 & 100 \end{pmatrix}; \quad \text{and} \quad N(7) = 1102.0.$$

The arrays S(0) through S(7) discussed above are the Neviatia-Babu template gradient impulse response arrays, as discussed in WILLIAM K. PRATT, DIGITAL IMAGE PROCESSING, p. 512 (2nd Ed. J. Wiley and Sons 1991). The arrays, when applied to a 5×5 sub-block of pixel data, provide relative information regarding whether there are edges, and the orientation of the edges in sub-block 405. S(0) is associated with 0 degree edges; S(1) is associated with 90 degree edges; S(2) is sensitive to horizontal edges; S(3) is sensitive to 30 degree edges; S(4) is sensitive to 120 degree edges; S(5) is sensitive to vertical edges; S(6) is sensitive to 60 degree edges; and S(7) is sensitive to 150 degree edges. In some embodiments, filters S(8) and S(9) can also be included, corresponding to filters for 45 degree and 135 degree edges, respectively. In general, any number of spatial filters can be utilized. A more accurate estimation of a replacement pixel value for pixel value 406 can be determined if the direction of any edge in the image that involves pixel value 406 is known.

In step 305, the maximum value among all of the values of A(r) is determined. The maximum filtered value, Max(A(r)), can be determined by simply determining which of the values A(r) is the highest value. The determination of which of the filter arrays S(r) results in the maximum filter value A(r) determines how a replacement value for pixel value 406 is determined.

In step 306, a set of video values V(m) are determined. Video value V(0) can be set to pixel value 406, B(3,3). In some embodiments, four video values V(1) through V(4) are set by a set of equations determined by which of values A(r) is the maximum value.

If A(0), corresponding to a 0 degree filter array, is maximum, then the video values V(1) through V(4) can be set as
V(1)=B(1,3);
V(2)=B(2,3);
V(3)=B(4,3); and
V(4)=B(5,3).

If A(1), corresponding to a 90 degree filter array, is maximum, then the video values V(1) through V(4) can be set as
V(1)=B(3,5);
V(2)=B(3,4);
V(3)=B(3,2); and
V(4)=B(3,1).

If A(2), corresponding to a horizontal filter array, is maximum, then the video values V(1) through V(4) can be set as
V(1)=B(3,5);
V(2)=B(3,4);

V(3)=B(3,2); and
V(4)=B(3,1).

If A(3), corresponding to a 30 degree filter array, is maximum, then the video values V(1) through V(4) can be set as
V(1)=B (1,2)*0.85+B(1,1)*0.15;
V(2)=B(2,3)*0.43+B(2,2)*0.57;
V(3)=B(4,3)*0.43+B(4,4)*0.57; and
V(4)=B(5,4)*0.85+B(5,5)*0.15.

If A(4), corresponding to a 120 degree filter array, is maximum, then the video values V(1) through V(4) can be set as
V(1)=B(2,5)*0.85+V(1,5)*0.15;
V(2)=B(3,4)*0.43+B(2,4)*0.57;
V(3)=V(3,2)*0.43+B(4,2)*0.57; and
V(4)=B(4,1)*0.85+B(5,1)*0.15.

If A(5), corresponding to a vertical filter array, is maximum, then the video values V(1) through V(4) can be set as
V(1)=B(1,3);
V(2)=B(2,3);
V(3)=B(4,3); and
V(4)=B(5,3).

If A(6), corresponding to a 60 degree filter array, is maximum, then the video values V(1) through V(4) can be set as
V(1)=B(2,1)*0.85+B(1,1)*0.15;
V(2)=B(3,2)*0.43+V(2,2)*0.57;
V(3)=B(3,4)*0.43+B(4,4)*0.57; and
V(4)=B(4,5)*0.85+B(5,5)*0.15.

If A(7), corresponding to a 150 degree filter array, is maximum, then the video values V(1) through V(4) can be set as
V(1)=B(1,4)*0.85+B(1,5)*0.15;
V(2)=B(2,3)*0.43+V(2,4)*0.57;
V(3)=V(4,3)*0.43+V(4,2)*0.57; and
V(4)=V(5,2)*0.85+V(5,1)*0.15.

If a filter corresponding to a 45 degree array is maximum, then video values V(1) through V(4) can be set as
V(1)=B(1,1);
V(2)=B(2,2);
V(3)=B(4,4); and
V(4)=B(5,5).

If a filter corresponding to a 135 degree array is maximum, then video values V(1) through V(4) can be set as
V(1)=B(1,5);
V(2)=B(2,4);
V(3)=B(4,2); and
V(4)=B(5,1).

Regardless of the number of different filter arrays, and the resulting number of ways that video values V(1) through V(4) can be set accordingly, video values V(0) through V(4) are set to take advantage of any edges that can be detected in the portion of the image in frame 403 corresponding to sub-block 405 centered around pixel value 406, which corresponds to value B(3,3) as discussed above in order to best estimate a replacement value for pixel value 406, B(3,3).

In step 307, a replacement pixel value for pixel value 406 is determined. In some embodiments, video values V(5) and V(6) can be set to the corresponding pixel value from second field 102, i.e. the pixel value from second field 102 that corresponds to pixel value 406 shown in frame 403. The pixel value from second field 102 can be inserted two or more times into the video values in order to weight the determination of the replacement pixel value towards the pixel value of the corresponding pixel in second field 102.

The values V(0) through V(6) are then sorted and the replacement pixel value to replace pixel value 406 shown in FIG. 4C is then determined to be the median placed value, corresponding to the value that is in the fourth slot after the sort. The replacement pixel value, P, is then given by
P=Mid-value(V(0) . . . V(6)), where the Mid-value is determined by sorting the values V(0) through V(6) and setting P to the fourth highest value (i.e., if the set V(0) . . . V(6) are sorted, then V(4) is the mid-value).

Figure 4D:
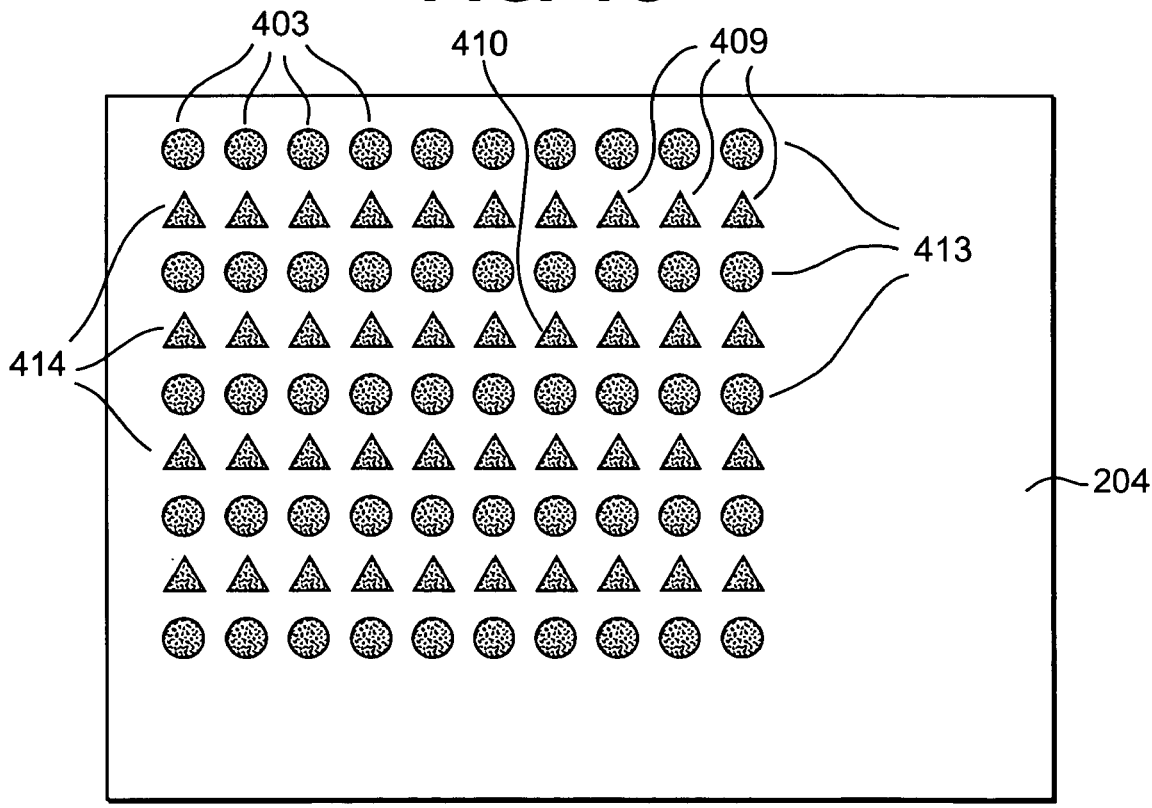

As is shown in FIG. 4D, the replacement pixel value P is then written into frame 204. The replacement pixel values P for each of the open circled pixel values 404 shown in frame 402 of FIG. 4B are shown as solid triangle pixel values 410 in FIG. 4D.

In step 308, flow chart 300 determines if there are any of pixel values 404 that have not be replaced by replacement pixel values P as described above. If there are, then the next sub-block, corresponding to calculation of the next replacement value P, is selected in step 303 and flow chart 300 continues the calculation. If all pixel values 404 have been replaced, then flow chart 300 stops in step 309.

When flow chart 300 stops in step 309, then frame 204 includes pixel values 403 written in from first field 101 and pixel values 409 which are determined by filtering utilizing pixel values 403 and pixel values from second field 102. As a result, the video image formed in frame 204 has been filtered to remove artifacts resulting from transmission of video data separately in the two fields, field 101 and field 102.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of interleaving video data, comprising:
placing first pixel values from a first field of video data into alternating rows of pixels in a video frame; and
augmenting the video frame in remaining rows of pixels in the video frame with replacement pixel values determined from the first pixel values and from second pixel values from a second field of video data, wherein augmenting the video frame includes:
selecting a sub-block of pixels centered on a current pixel of one of the remaining rows; and
determining an orientation of at least one edge of an image that includes the current pixel.

2. The method of claim 1, wherein augmenting the video frame further comprises:
interpolating from the first pixel values in the video frame to provide interpolated pixel values in the remaining rows of pixels in the video frame;
selecting at least one spatial filter of a set of spatial filters based on the orientation of the at least one edge of the image;
determining a set of filter values from spatially filtering the sub-block of pixels using the at least one spatial filter;
determining video values based on the set of filter values; and determining a replacement pixel value for the interpolated pixel value based on the video values and a second pixel value from a second field of video data.

3. The method of claim 2, wherein interpolating from the first pixel values comprises averaging the first pixel value from an immediately preceding row and one from an immediately following row to determine the interpolated pixel values.

4. The method of claim 2, wherein determining the set of filter values includes taking a product of a set of spatial filter arrays and the sub-block of pixel values to form the set of filter values.

5. The method of claim 4, wherein determining video values comprises:

determining an optimum filter value from the set of filter values; and calculating a set of video values from the sub-block of pixel values in a fashion determined by the optimum filter value.

\* \* \* \* \*